(12) United States Patent
Rode et al.

(10) Patent No.: US 10,040,346 B2
(45) Date of Patent: Aug. 7, 2018

(54) POWER TRANSFER UNIT (PTU) ASSEMBLY WITH HYDRAULICALLY ACTUATED DISCONNECT REAR OUTPUT SHAFT

(71) Applicant: BorgWarner Inc., Auburn Hills, MI (US)

(72) Inventors: John H. Rode, Swartz Creek, MI (US); Jeremy L. Cradit, Grand Blanc, MI (US); Keith V. Feldt, Waterford, MI (US)

(73) Assignee: BorgWarner Inc., Auburn Hills, MI (US)

( * ) Notice: Subject to any disclaimer, the term of this patent is extended or adjusted under 35 U.S.C. 154(b) by 314 days.

(21) Appl. No.: 15/084,959

(22) Filed: Mar. 30, 2016

(65) Prior Publication Data
US 2016/0288642 A1 Oct. 6, 2016

Related U.S. Application Data

(60) Provisional application No. 62/142,137, filed on Apr. 2, 2015.

(51) Int. Cl.
*B60K 17/344* (2006.01)
*B60K 17/35* (2006.01)
*B60K 23/08* (2006.01)

(52) U.S. Cl.
CPC ............ *B60K 17/344* (2013.01); *B60K 17/35* (2013.01); *B60K 17/3515* (2013.01); *B60K 23/0808* (2013.01); *B60K 2023/0866* (2013.01)

(58) Field of Classification Search
CPC .......................... B60K 17/344; B60K 23/0808
See application file for complete search history.

(56) References Cited

U.S. PATENT DOCUMENTS

| | | | |
|---|---|---|---|
| 9,586,477 B2* | 3/2017 | Rode | B60K 23/08 |
| 2004/0222032 A1* | 11/2004 | Nakatani | B60K 17/105 |
| | | | 180/367 |
| 2005/0107200 A1* | 5/2005 | Yamazaki | B60K 17/344 |
| | | | 475/84 |
| 2015/0314679 A1* | 11/2015 | Rode | B60K 23/08 |
| | | | 180/233 |
| 2016/0318392 A1* | 11/2016 | Kowalsky | B60K 17/344 |

* cited by examiner

*Primary Examiner* — Derek D Knight
(74) *Attorney, Agent, or Firm* — Warn Partners, P.C.

(57) ABSTRACT

An arrangement of a vehicle is provided having normal transverse engine/transmission normal two-wheel drive operation which can be selectively placed into four-wheel drive operation wherein a pump which powers the coupling or uncoupling is independent of the transmission lubrication pump and is powered by the transmission.

15 Claims, 9 Drawing Sheets

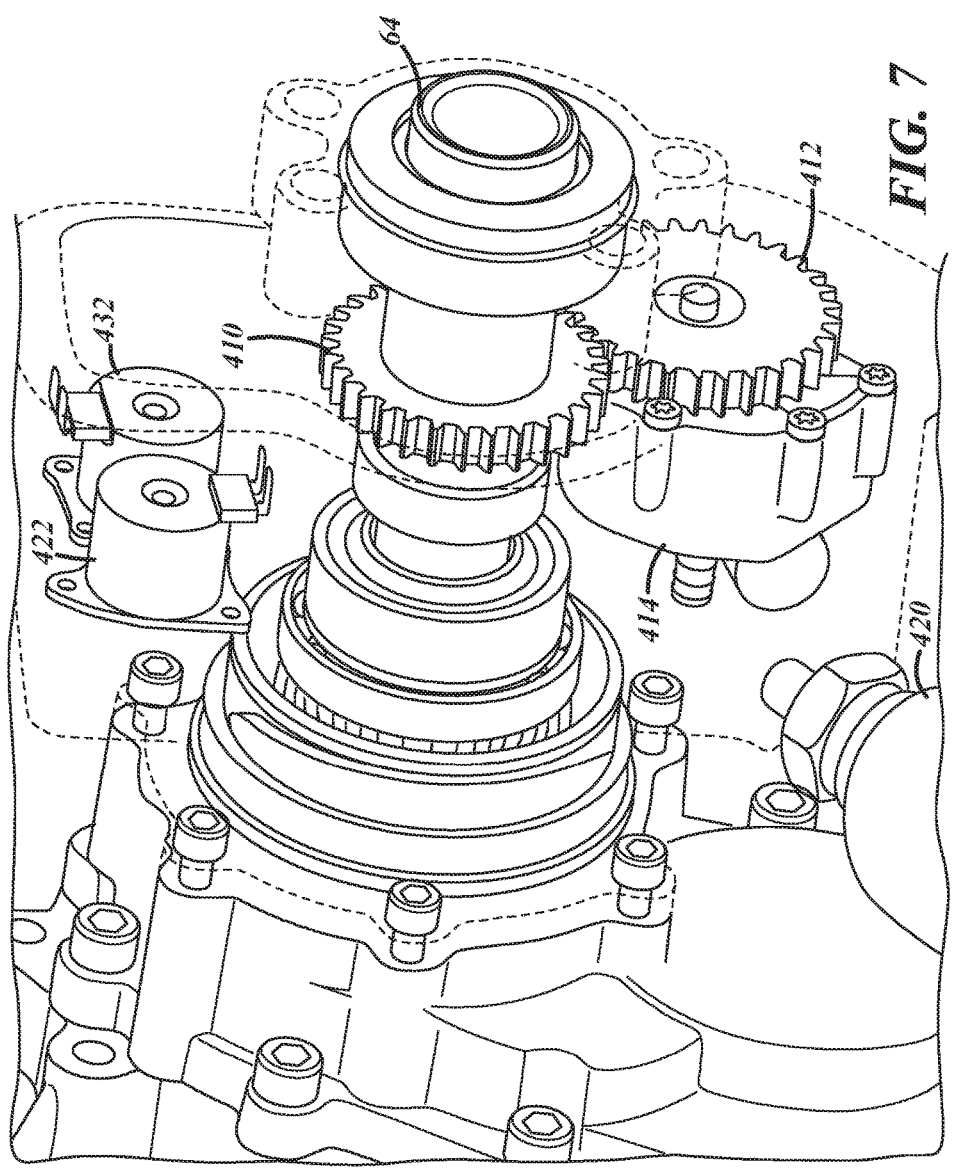

POWER TRANSFER UNIT (PTU) ASSEMBLY WITH HYDRAULICALLY ACTUATED DISCONNECT REAR OUTPUT SHAFT

CROSS-REFERENCE TO RELATED APPLICATIONS

This application claims the benefit of U.S. Patent Application No. 62/142,137 filed on Apr. 2, 2015, the disclosure of which is herein incorporated by reference in its entirety.

FIELD OF THE INVENTION

The present invention relates to arrangement of front wheel drive vehicles having transverse mounted engines with four wheel drive capabilities upon demand.

BACKGROUND OF THE INVENTION

To increase fuel economy, many vehicles have been switched over to front wheel drive so that the vehicle engine's weight can be over the main traction axle of a vehicle. To further increase fuel economy, many front wheel drive vehicles utilize a transverse mounted engine and transmission. To provide improved performance in inclement weather, many vehicles have selective four wheel drive capabilities. Typically in most front wheel drive vehicles with four wheel drive capability, the transmission powers a front differential. Torsionally downstream of the front differential is a power takeoff unit (PTU). The PTU couples the front differential with a prop shaft extending longitudinally to a rear axle and differential. To maximize fuel efficiency in selective four wheel drive vehicles, it is desirable to torsionally not only cut off the rear axle from the vehicle engine, but additionally causes the propeller (prop) shaft and most of the PTU to stop rotating. For quickest actuation/shift time for the demand of four wheel drive, the PTU requires some type of hydraulic actuation from a pressure source. Typically, it is not desirable to use the transmission pump as a source of pressurized fluid since it is expensive to increase the capacity of the transmission pump and because of the hydraulic line routing required between the transmission and PTU. It has been customary that the PTU hydraulic actuation be supplied by an auxiliary electric pump so that the coupling and uncoupling of the prop shaft from the vehicle engine can occur when the vehicle has previously been in an uncoupled condition. It is desirable to provide an arrangement of a vehicle wherein a pump for the PTU can be placed engine powered while still not requiring an auxiliary electric pump or utilizing the hydraulic pump typically associated with the transmission lubrication.

SUMMARY OF THE INVENTION

To meet the above noted desires and to provide other advantages, a revelation of the present invention is brought forth. The present invention brings forth an arrangement of a vehicle having normal transverse engine/transmission normal two wheel drive operation which can be selectively placed into four wheel drive operation wherein the pump which powers the coupling or uncoupling is engine/transmission powered without utilization of an electrically powered pump or a transmission lubrication pump.

BRIEF DESCRIPTION OF THE DRAWINGS

The present invention will become more fully understood from the detailed description and the accompanying drawings, wherein:

FIG. 7 is a perspective view of the actuator shown in FIGS. 5 and 6;

DETAILED DESCRIPTION OF THE PREFERRED EMBODIMENTS

The following description of the preferred embodiment(s) is merely exemplary in nature and is in no way intended to limit the invention, its application, or uses.

Figure 1:
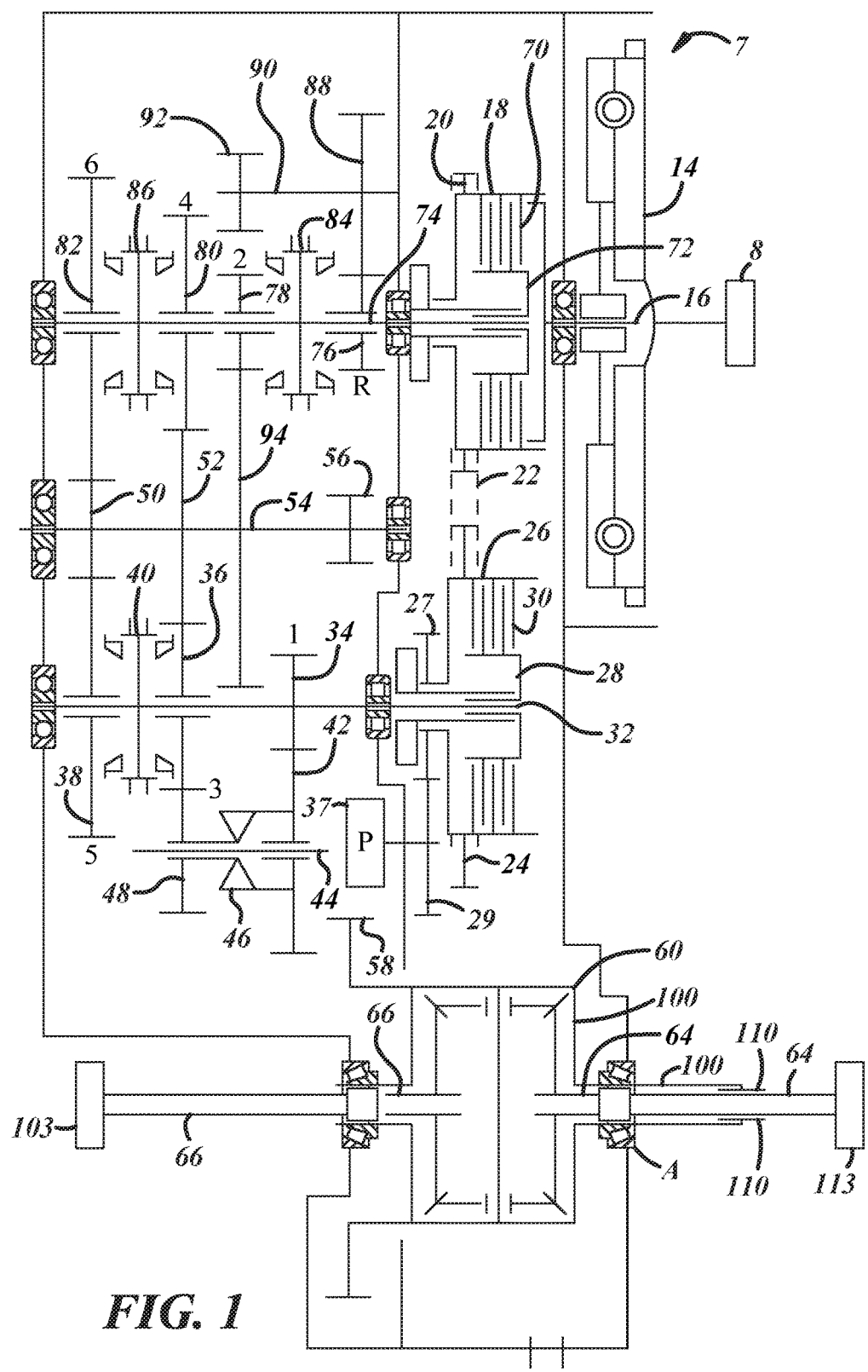
FIG. 1 is a schematic view of the transmission in the arrangement of an automotive passenger vehicle having normal front-wheel drive and selective four-wheel drive according to the present invention.
Figure 2:
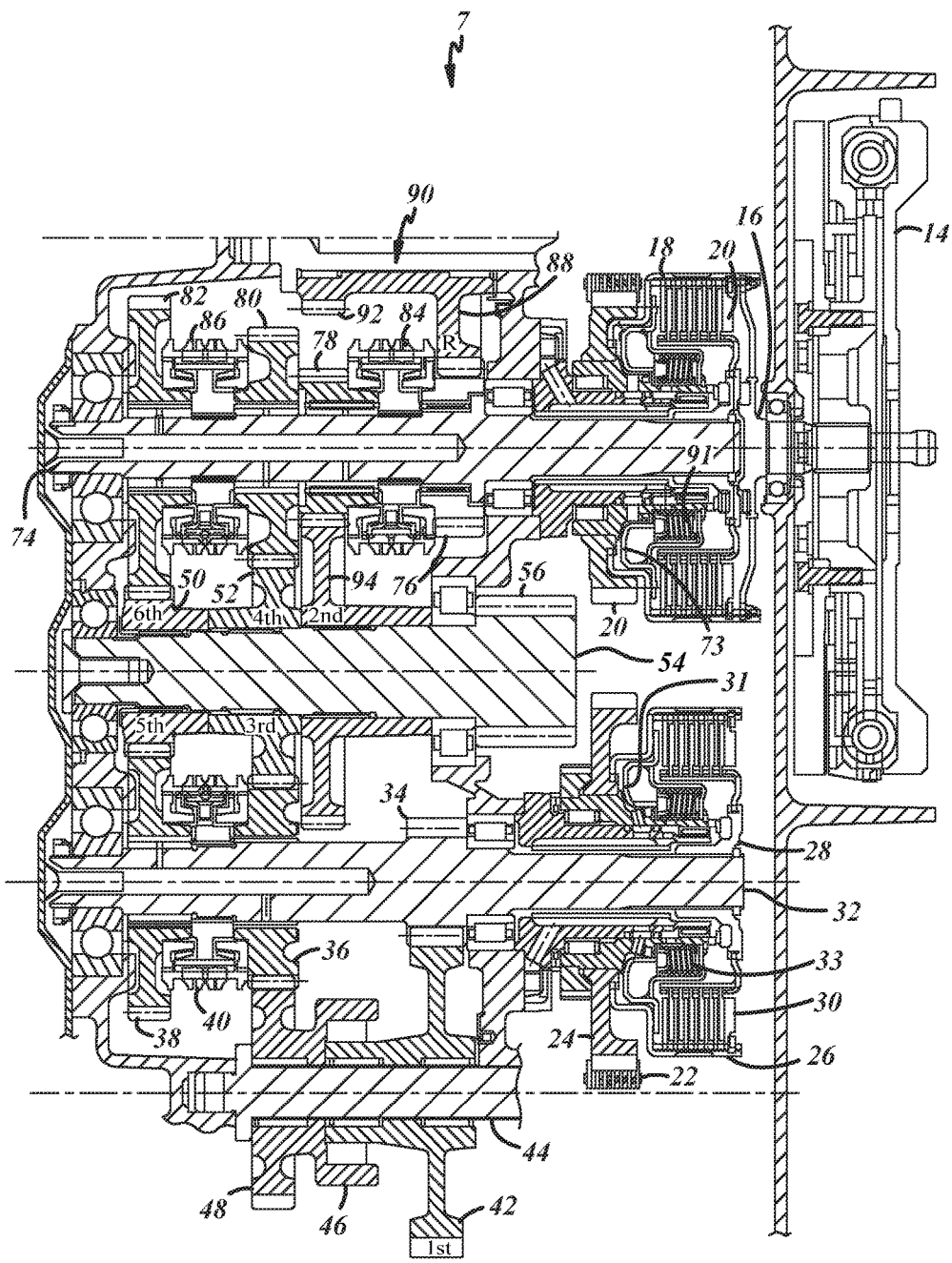
FIG. 2 is a sectional view of the transmission shown in FIG. 1.
Figure 3:
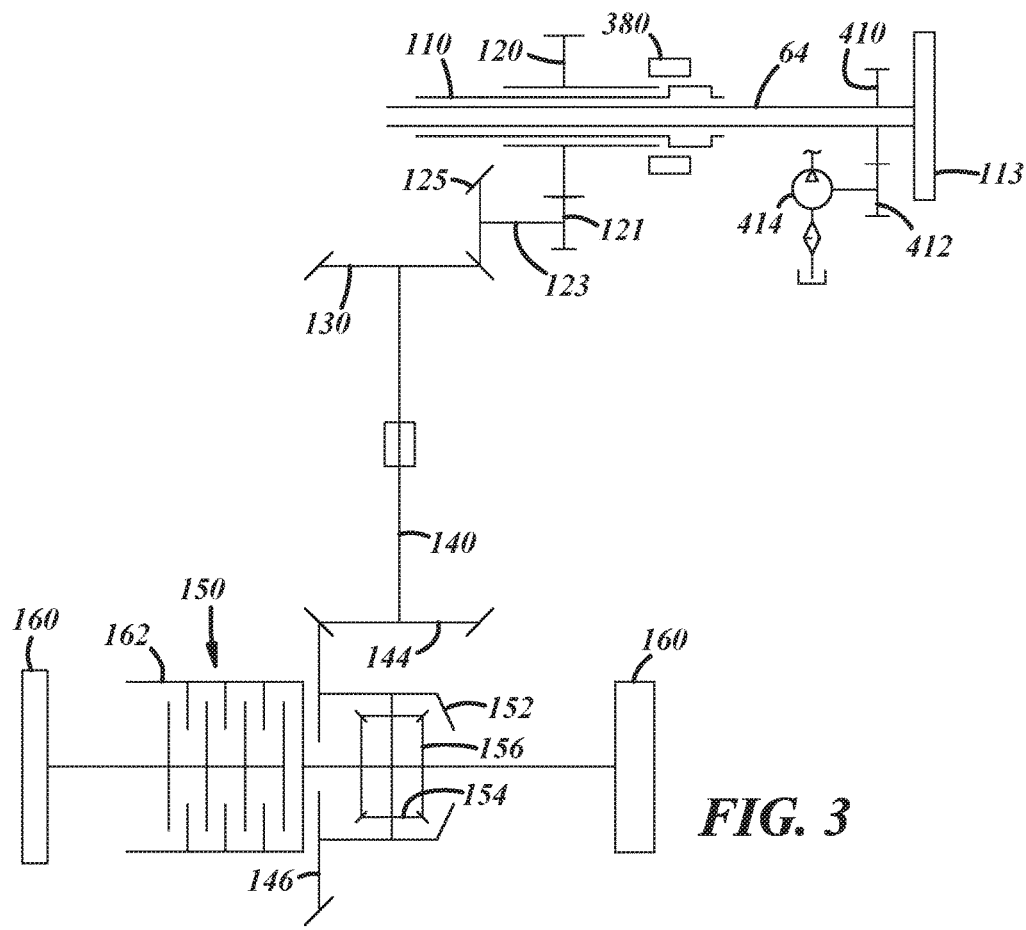
FIG. 3 is a schematic view of the remainder of a power train of the invention shown in FIGS. 1 and 2.

Referring to FIGS. 1, 2 and 3, a transverse mounted engine 8 of a normally front wheel drive selectively four wheel drive vehicle arrangement powers a six speed dual clutch transmission 7 of the present invention. The engine 8 typically will have a fly wheel connected with a damper 14. The damper is torsionally connected with a first clutch input shaft 16. The first clutch input shaft 16 is connected with a first clutch housing 18. The first clutch housing 18 is torsionally connected with a sprocket 20. The sprocket 20 is torsionally connected with a chain 22. The chain 22 is torsionally engaged with a second clutch housing sprocket 24. The second clutch housing sprocket 24 is fixably connected with a second clutch housing 26. The first clutch housing sprocket 20 has a diameter that is smaller than the diameter of the second housing sprocket 24; consequently, the first clutch housing 18 spins faster than the second clutch housing 26.

The second clutch housing 26 is selectively connected with a hub 28 via a friction pack 30. The housing 26 also has a gear that powers an output gear 29 powering a lubrication and transmission pressure activation oil pump 37. A clutch actuator piston 31 is provided to engage the friction pack 30 with the hub 28. The hub 28 is torsionally connected with a second input shaft 32. The second input shaft 32 has torsionally affixed thereto, a first gear ratio input gear 34. The second input shaft 32 also has rotatably mounted thereon third gear ratio input gear 36 and fifth gear ratio input gear 38. To torsionally selectively connect the fifth input gear 38 or the third input gear 36 with the second input shaft 32, there is provided a fifth/third synchronizer 40.

The first input gear 34 is continually meshed with an idler gear input gear 42. The idler gear input gear 42 is rotatably mounted on an idler shaft 44. The idler shaft input gear 42 is torsionally connected via a one-way clutch 46 with an idler shaft output gear 48. The idler shaft output gear 48 is in continual mesh with the third input gear 36.

Fifth input gear 38 is in mesh with a fifth output gear 50. Third input gear 36 is meshed with a third output gear 52. Output gears 50 and 52 are torsionally affixed to an output shaft 54. Output shaft 54 also has torsionally affixed thereto a final drive pinion 56. Final drive pinion 56 is meshed with a differential input gear 58. Differential input gear 58 is a ring gear which is connected with a front differential casing 60 (sometimes referred to as a housing) which in turn drives two axial shafts 64 and 66. In other embodiments, (not shown), the transmission can have dual output shafts similar to that shown in "DCT TRANSMISSION UTILIZING TWO AXIS CHAIN", U.S. Pat. No. 8,342,051 filed Jun. 29, 2009, to Pritchard et al.

The first clutch housing 18 via a friction pack 70 is selectively torsionally engaged with a hub 72 which is splined to a first input shaft 74. The first input shaft 74 rotatably mounts a reverse drive input gear 76, a second gear ratio input gear 78, a fourth gear ratio input gear 80 and a sixth gear ratio input gear 82. The reverse drive or input gear 76 is in a bisecting coaxial plane of the final drive pinion 56. To torsionally affix the reverse input gear 76 or the second input gear 78 with the first input shaft 74, there is provided a second/reverse synchronizer actuator 84. To torsionally connect the sixth input gear 82 or the fourth gear ratio input gear 80 with the first input shaft 74, there is provided a sixth fourth synchronizer 86. The reverse input gear 76 is continually meshed with a reverse idler shaft input gear 88 which is in turn torsionally connected via reverse idler shaft 90 with a reverse idler shaft output gear 92 which meshes with a second output gear 94. Gear 50 also serves as an output gear for sixth input gear 82. Gear 52 also functions as an output gear for the fourth input gear 80.

The front differential 60 casing 100 is torsionally connected with a rear input shaft 110. The front differential also has a side gear connected with a wheel shaft 64. The wheel shaft 64 is connected via a half shaft (not shown) with a wheel 113. The wheel shaft 64 extends through a rear axle input shaft 110. On the opposite side of the front differential 60 is a wheel shaft 66 which via a half shaft (not shown) is connected with a wheel 103.

Figure 4:
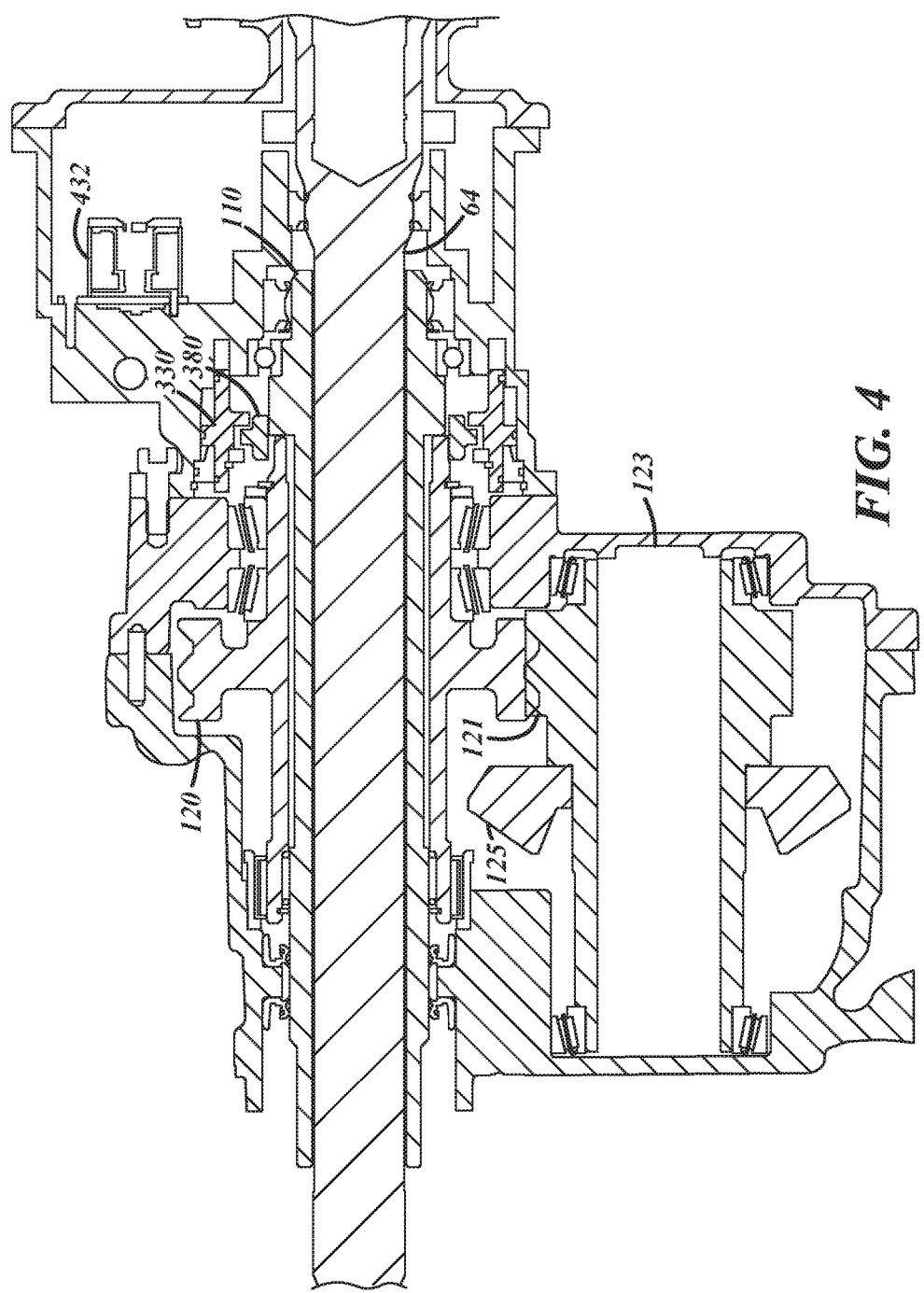
FIG. 4 is a sectional view of a power take off unit utilized in the arrangement of the present invention.

Referring additionally to FIG. 4, the casing 100 of the front differential in a manner similar to transmission 7 extends transversely to a main axis of the vehicle. The rear axle input shaft 110 is spline connected to the differential casing 100. Rotatably mounted on the rear axle input shaft is a rear axle input gear 120. The rear axle input gear 120 meshes with gear 121. Gear 121 rotates shaft 123 and gear 125. Gear 125 is torsionally connected with a prop shaft input gear 130. Prop shaft input gear 130 is connected with a longitudinally rearward extending prop shaft 140. The prop shaft 140 may be a single elongated member or a plurality of members joined by universal joints. The end of the prop shaft 140 has connected thereto an output gear 144. The output gear 144 is torsionally connected with a ring gear 146 of a rear axle differential 150. Rear differential 150 has a casing 152 with drive gears 154. Drive gears 154 mesh with side gears 156. Side gears 156 are connected with rear wheel shafts 158 which are in turn connected with rear wheels 160. In a first state of operation the rear axle differential 150 differentially powers the rear wheels 160. The rear axle differential 150 has a clutch 162 which can selectively couple the side gears 156 of the rear differential with the rear wheels 160. When the clutch 162 is open, the ring gear 146 and the casing 152 and prop shaft output gear 144 and prop shaft 140 do not have rotational movement. However, the rear wheels 160 will rotate upon any movement of the vehicle even though the rear wheels 160 are unpowered. Rear axle differential 150 in a second state of operation wherein the clutch 162 is open, the wheels 160 are non-driven and can freewheel with respect to one another.

Figure 5:
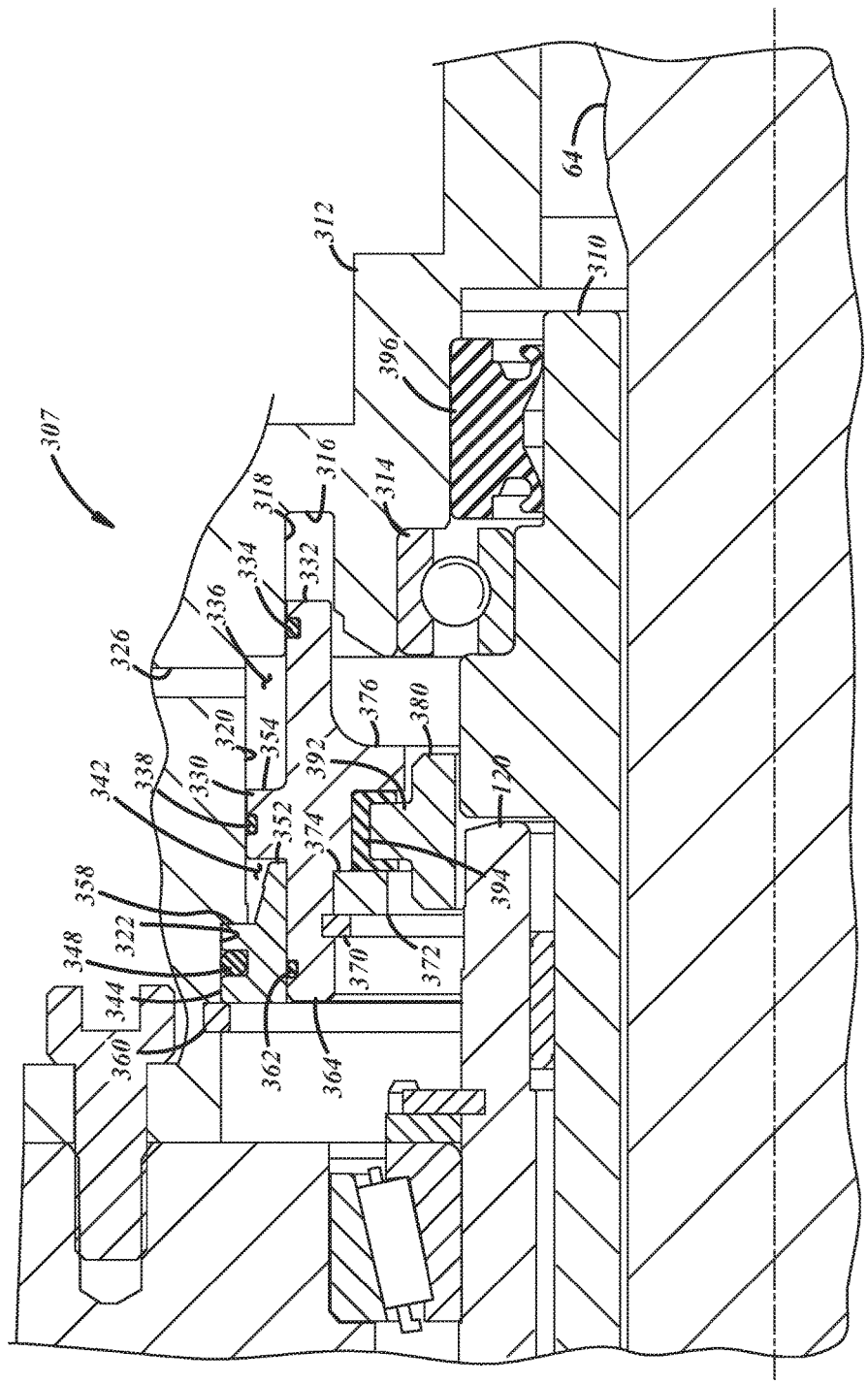
FIG. 5 is an actuator of the present invention.
Figure 6:
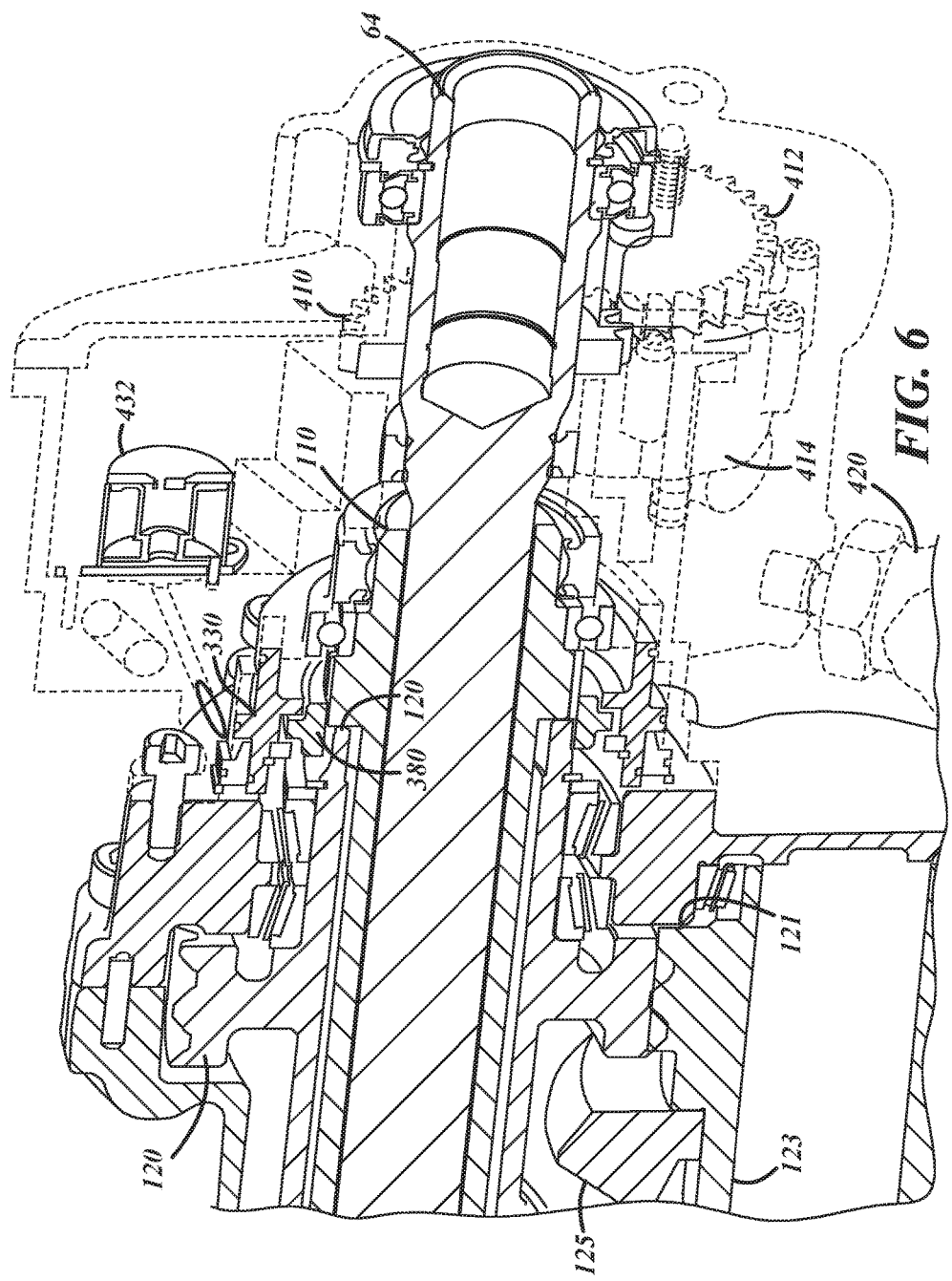
FIG. 6 is a side sectional view of the actuator shown in FIG. 5

Referring additionally to FIG. 5, hydraulic actuator 307 of the present invention has a driving member provided by rear axle input shaft 110. An end of shaft 110 is rotatably mounted within a PTU frame 312 by a bearing 314 and is sealed by a seal 396. The frame 312 has a rectangular cross-sectional angular groove 316 with a first outer radius 318. The frame 312 also has a second outer radius 320 and a third outer radius 322. Second outer radius 320 is intersected with an applied pressure bore 326 and a release pressure bore 328.

An aluminum piston 330 is provided. The piston 330 has a leg 332 aligned by the frame groove 316. The piston leg 332 has an outer radial surface seal 334 to seal an apply chamber 336 that is fluidly connected with the apply pressure bore 326. The seal 334 seals at the second radius 318. The piston 330 also has a seal 338 sealing at radius 320 to separate the apply chamber 336 from a release chamber 342. The release chamber 342 fluidly connects with the release pressure bore 328. A stopper 344 has a seal 348 which seals chamber 342. Stopper 344 has a point 352 that limits axial travel of a radial arm 354 of the piston 330. The stopper 344 abuts a shoulder 358 of the frame 312. The stopper 344 is held in position by a snap ring 360. The stopper 344 inner radial surface is sealed by a piston seal 362 in a head 364 of the piston. Seal 362 is at the same radius as seal 334. The seal 362 seals the apply pressure chamber 342. Along its inner radius, the piston 332 has an annular groove to hold in a snap ring 370. The snap ring 370 retains an aluminum blocker ring 372 against a shoulder 374 of the piston. The piston has a blocker portion 376. A steel shift collar 380 is shown in FIG. 5 spline connected along its inner radius with a driving member produced by the rear axle input shaft 310 and with an extension of a rear axle input gear 120. The shift collar 380 has a head 392 covered with a polymeric plastic bumper 394 for contact with the blocker portion 376 of the piston and the blocker ring 374. To actuate the shift collar 380 to connect the driven rear axle input shaft 110 with the rear axle input gear 120, pressure chamber 336 is pressurized and pressure chamber 342 is relieved to sump. To disengage the rear axle of the vehicle to go back to two-wheel drive, pressure chamber 342 is pressurized and pressure chamber 336 is relieved to sump. A seal 392, bearing 314, piston 332, shift collar 380, and the remainder of the actuator components can all be assembled from the left side of the snap ring 360 as shown in FIG. 5.

Figure 10:
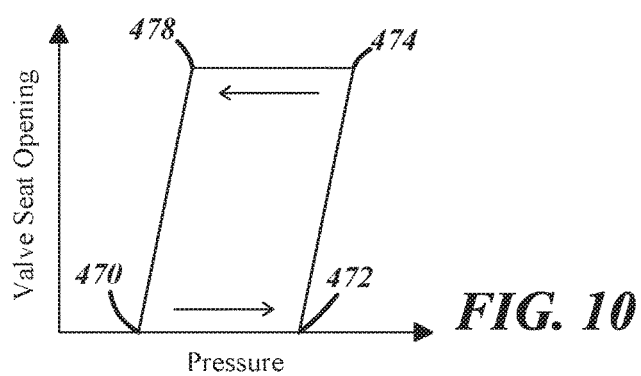
FIG. 10 is an alternate embodiment hydraulic schematic of the embodiment of the hydraulic control system for the actuator shown in FIGS. 5 and 6.
Figure 9:
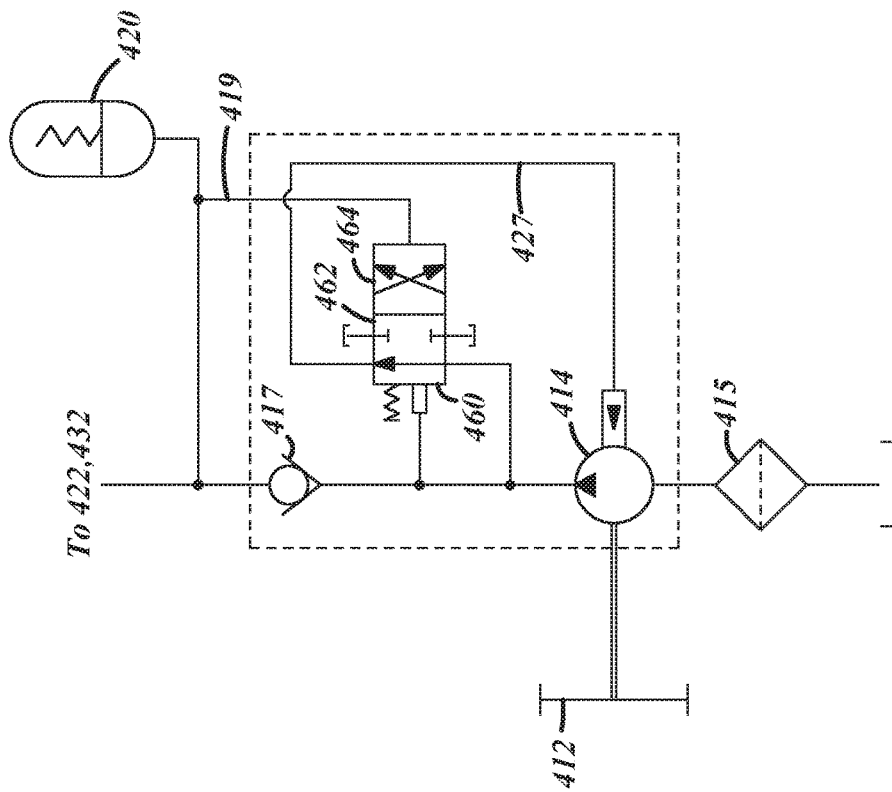
FIG. 9 is an alternate embodiment hydraulic schematic of the embodiment of the hydraulic control system for the actuator shown in FIGS. 5 and 6.
Figure 8:
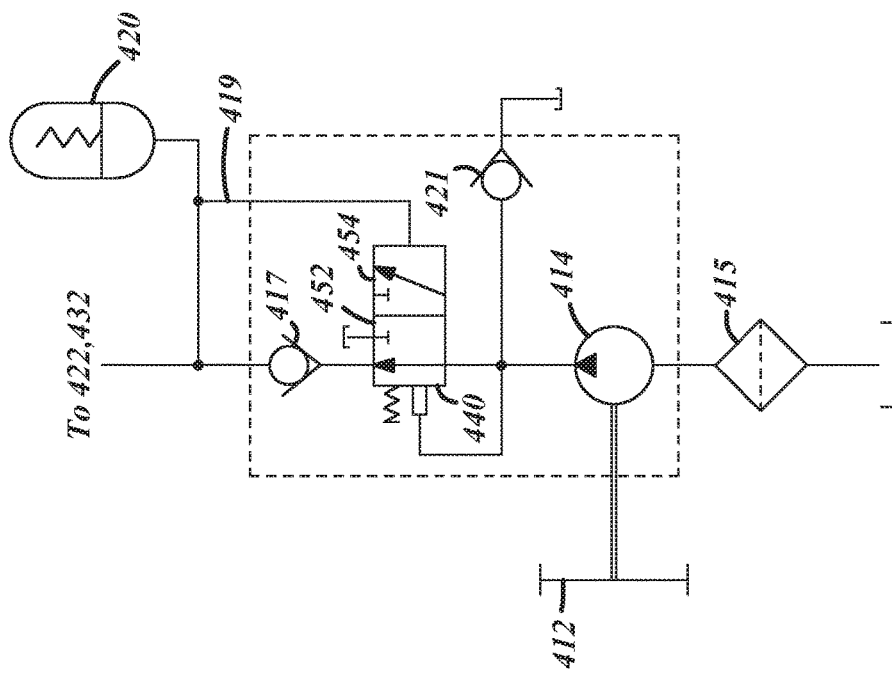
FIG. 8 is a hydraulic schematic of the embodiment of the hydraulic control system for the actuator shown in FIGS. 5 and 6.

Referring additionally to FIGS. 6-10, the wheel shaft 64 has torsionally fixably connected thereto a gear 410. Gear 410 is meshed with pump gear 412. The gear train of gears 410 and 412 allow the wheel shaft 64 to power a hydraulic pump 414. Hydraulic pump 414 is connected with a sump via a filter 415. Hydraulic pump 414 is connected with an accumulator 420 via a check valve 417. A relief valve 440 is bias placed valve sector 452 in communication with the check valve 417. A pilot line 419 is also connected with the relief valve sector 454 to communicate the output of the pump 414 with a sump to prevent overcharging of the accumulator 420. Another check valve 421 is provided to prevent the hydraulic circuit from ingesting air during reverse pump rotation regardless of the relief valve 440's position. The valves 440, 421, and 417 are often contained within the enclosure of the pump 414. The output of the pump 414 or the accumulator 420 is delivered to solenoids 422 and 432. Solenoid 432 is fluidly connected with disengage chamber 342 and can selectively connect the release chamber 342 with the accumulator 420 or with the sump. In a similar manner, solenoid 422 is fluidly connected to engage chamber 336 and can selectively connect engage chamber 336 with the accumulator 420 or with a sump. To minimize expense and weight, typically the maximum output of the pump 414 in steady state operation is less than that required for actuation of the hydraulic actuator 307. Accumulator 420 is provided to deliver the volume of pressurized fluid needed to ensure proper operation and typically the accumulator 420 will be sized to have several cycles of actuation. FIG. 9 presents an alternative actuation circuit wherein the output of the pump 414 is delivered to a relief valve 460 which in its normal position connects a portion of the output of the pump 414 as a pilot line 427 of the pump. The accumulator also has a pilot line 419 which provides feedback to sector 464 of the valve 460. FIG. 10 illustrates a cycle of operation wherein the pump 414 will have a valve seat to valve plunger distance which is acted upon by the pilot line 427. Starting at point 470 the release function will have valve 460 virtually totally closed as pressure builds up to 472. As pressure builds up from point 472 to 474 the valve seat opening gradually increases to a point 474. The valve seat opening causes a loss of pressure to point 478 and a loss in pressure to 478 to 470 as the valve plunger moves closer to the valve seat at a cutoff of the release valve function returning to point 470.

Figure 12:
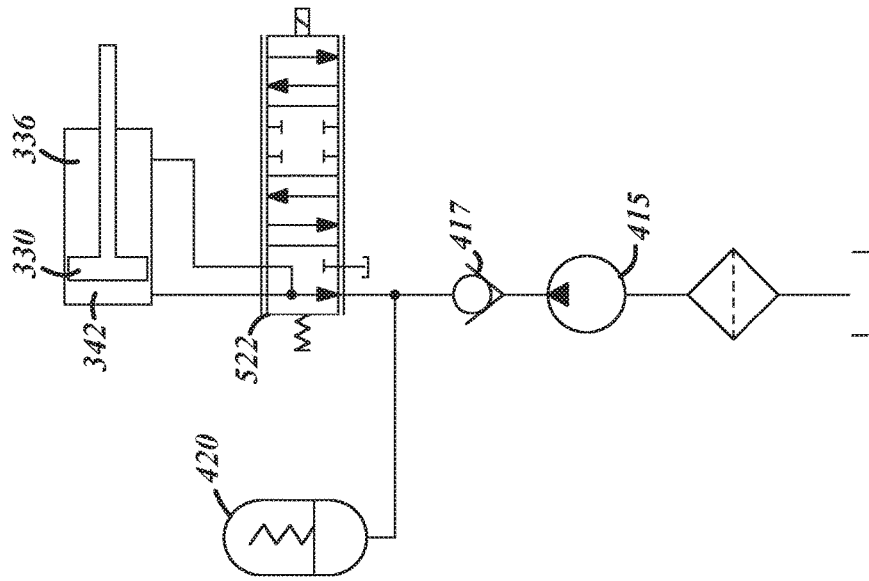
FIG. 12 is an alternate embodiment hydraulic schematic of the embodiment of the hydraulic control system for the actuator shown in FIGS. 5 and 6.
Figure 11:
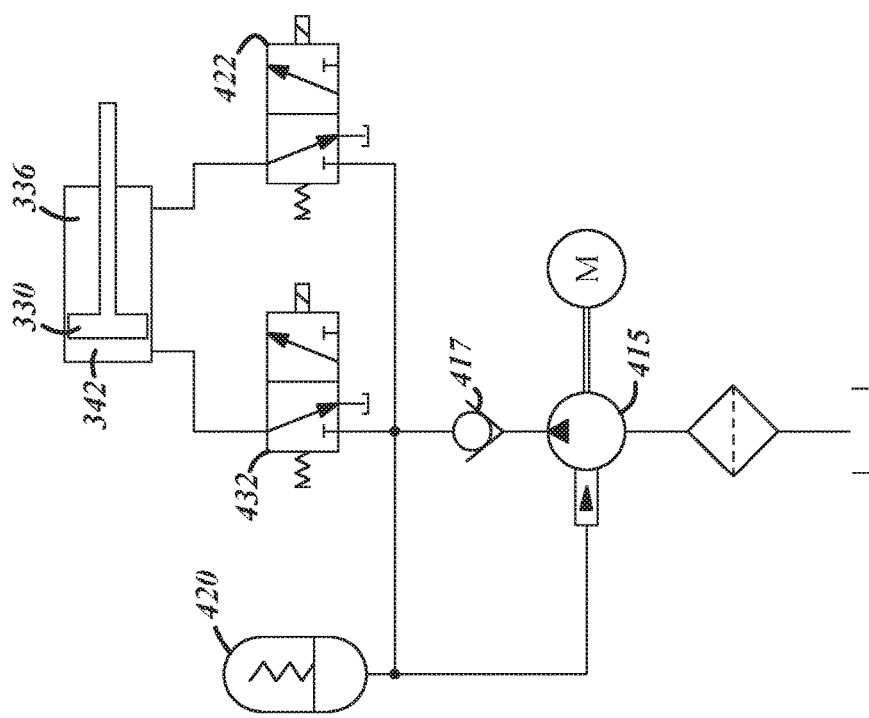
FIG. 11 is an alternate embodiment hydraulic schematic of the embodiment of the hydraulic control system for the actuator shown in FIGS. 5 and 6.

FIG. 11 is a simplified hydraulic circuit that can utilized with the actuator of the present invention. Additionally in an embodiment not shown, a relief valve or lift plate can be utilized. A variable displacement pump can also be utilized. FIG. 12 illustrates a 4 position solenoid valve 522 being utilized instead of the dual solenoids 432 and 422 of the embodiment shown in FIG. 11.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An arrangement for an automotive passenger vehicle having normal front-wheel drive and selective four-wheel drive, said arrangement comprising:
    a transmission transversely mounted in said vehicle powered by a transversely-mounted vehicle engine, said transmission having a lubrication pump;
    a front axle differential powered by said transmission having a casing extending transversely to said vehicle main axis, said front axle differential having front wheel shafts connecting with side gears for powering front wheel of said vehicle;
    a rear axle input shaft connected with front axle differential casing and encircling at least one of said front wheel shafts;
    a rear axle input gear rotatably mounted on said rear axle input shaft for powering a torsionally connected prop shaft;
    a rear axle differential torsionally connected with said prop shaft;
    a shift collar having a first position torsionally coupling said rear axle input shaft with said rear axle input gear and a second position decoupling said rear axle input gear with said rear axle input shaft;
    a hydraulic actuator for translating said shift collar; and
    a hydraulic pump independent of said transmission lubrication pump, said hydraulic pump being powered by said transmission, said hydraulic pump powering said hydraulic actuator.

2. An arrangement as described in claim 1 wherein said actuator includes a cylinder with a piston pressurizable on both sides of said piston and said actuator is provided within a frame rotatively mounting at least an end of said rear axle input shaft.

3. An arrangement as described in claim 2 wherein each side of said piston has individual solenoid actuated control to deliver fluid to said side of said piston or to release said side of said piston to a sump.

4. An arrangement as described in claim 1 wherein said rear axle differential has a ring gear torsionally connected with the prop shaft and said ring gear is connected with a casing having a clutch connection with one of said rear wheels.

5. An arrangement as described in claim 1 wherein said actuator includes a piston mounted inside a frame rotatively mounting at least an end of said rear axle input shaft and wherein said piston is fabricated from aluminum and said shift collar is fabricated from steel.

6. An arrangement as described in claim 1 having an actuator with a piston inside a frame rotatively mounting at least one end of said rear axle input shaft wherein said piston can be assembled within the frame from one side of the frame.

7. An arrangement as described in claim 1 wherein said actuator includes a piston having a leg aligned by a groove provided in a frame rotatively mounting at least an end of said rear axle input shaft.

8. An arrangement as described in claim 2 wherein said actuator has an applied pressure chamber and a release pressure chamber sealed at a common radius.

9. An arrangement as described in claim 1 wherein said hydraulic pump is torsionally connected to said one of said wheel shafts that is encircled by said rear axle input shaft by a gear train.

10. An arrangement as described in claim 1 wherein said hydraulic pump is connected with an accumulator.

11. An arrangement as described in claim 10 wherein said hydraulic pump is connected with said accumulator via a check valve.

12. An arrangement as described in claim 11 wherein the pressure within said accumulator pilots operation of said hydraulic pump.

13. An arrangement as described in claim 10 wherein said hydraulic pump in a steady state does not have enough capacity to operate said hydraulic actuator and wherein said accumulator has enough capacity for operating said hydraulic actuator multiple times.

14. An arrangement for an automotive passenger vehicle having a normal front-wheel drive and selective four-wheel drive, said arrangement comprising:
    a transmission transversely mounted in said vehicle powered by a transversely-mounted vehicle engine, said transmission having a lubrication pump;
    a front axle differential powered by said transmission having a casing extending transversely to said vehicle main axis, said front axle differential having front wheel shafts connecting with side gears for powering front wheels of said vehicle;

a rear axle input shaft connected with said front axle differential casing and encircling at least one of said front wheel shafts;

a rear axle input gear rotatably mounted on said rear axle input shaft for powering a torsionally connected prop shaft;

a rear axle differential with a ring gear torsionally connected with said prop shaft, said ring gear being connected with a casing having drive gears powering side gears connected with said rear wheel shafts, said rear wheel shafts powering rear wheels of said vehicle, said casing also having a clutch connection with one of said rear wheels, said rear axle differential having a first state of operation differentially powering said rear wheels and said rear axle differential having a second state wherein said casing has a disconnected clutch connection with one of said rear wheels to allow said rear wheels to be non-driven and freewheel with respect to one another;

a shift collar mounted within a frame rotatively mounting an end of said rear axle input shaft for selectively coupling said rear axle input gear with said rear axle input shaft; said shift collar having a first position torsionally coupling said rear axle input gear with said rear axle input shaft, and said shift collar having a second position uncoupling said rear axle input shaft gear from said rear axle input shaft;

a hydraulic actuator for translating said shift collar including a piston mounted within said frame, said piston having a seal separating an applied pressure chamber and a release pressure chamber, said piston being fabricated from aluminum having a bumper connection with said shift collar and said shift collar being fabricated from steel;

a hydraulic pump torsionally gear connected with a gear connected on said wheel shaft that is encircled by said rear axle input shaft; and an accumulator fluidly connected with said pump and said hydraulic actuator to supply pressurized hydraulic fluid to said actuator.

15. An arrangement for an automotive passenger vehicle having a normal front-wheel drive and selective four-wheel drive, said arrangement comprising:

a transmission transversely mounted in said vehicle powered by a transversely-mounted vehicle engine, said transmission having a lubrication pump;

a front axle differential powered by said transmission having a casing extending transversely to said vehicle main axis, said front axle differential having front wheel shafts connecting with side gears for powering front wheels of said vehicle;

a rear axle input shaft connected with said front axle differential casing and encircling at least one of said front wheel shafts;

a rear axle input gear rotatably mounted on said rear axle input shaft for powering a torsionally connected prop shaft;

a rear axle differential with a ring gear torsionally connected with said prop shaft, said ring gear being connected with a casing having drive gears powering side gears connected with said rear wheel shafts, said rear wheel shafts powering rear wheels of said vehicle, said casing also having a clutch connection with one of said rear wheels, said rear axle differential having a first state of operation differentially powering said rear wheels and said rear axle differential having a second state wherein said casing has a disconnected clutch connection with one of said rear wheels to allow said rear wheels to be non-driven and freewheel with respect to one another;

a shift collar mounted within a frame rotatively mounting an end of said rear axle input shaft for selectively coupling said rear axle input gear with said rear axle input shaft; said shift collar having a first position torsionally coupling said rear axle input gear with said rear axle input shaft, and said shift collar having a second position uncoupling said rear axle input shaft gear from said rear axle input shaft;

a hydraulic actuator for translating said shift collar including a piston mounted within said frame, said piston having a seal separating an applied pressure chamber and a release pressure chamber, said piston being fabricated from aluminum having a bumper connection with said shift collar and said shift collar being fabricated from steel;

a hydraulic pump torsionally gear connected with a gear connected on said wheel shaft that is encircled by said rear axle input shaft, said pump having a steady state capacity less than that required to operate said hydraulic actuator; and an accumulator fluidly connected with said hydraulic pump to supply pressurized hydraulic fluid to said hydraulic actuator, said accumulator having a capacity to power said hydraulic actuator multiple times.

* * * * *